United States Patent
Liao

(10) Patent No.: US 12,487,947 B2
(45) Date of Patent: Dec. 2, 2025

(54) DATA ACCESS METHOD FOR DIRECT MEMORY ACCESS (DMA), AND PROCESSOR WITH CIRCULAR BUFFER REUSE

(71) Applicant: Black Sesame Technologies Co. Ltd., Hubei (CN)

(72) Inventor: Xing Liao, Chengdu (CN)

(73) Assignee: Black Sesame Technologies Co. Ltd., Wuhan (CN)

( * ) Notice: Subject to any disclaimer, the term of this patent is extended or adjusted under 35 U.S.C. 154(b) by 403 days.

(21) Appl. No.: 17/728,425

(22) Filed: Apr. 25, 2022

(65) Prior Publication Data

US 2022/0358059 A1    Nov. 10, 2022

(30) Foreign Application Priority Data

May 7, 2021 (CN) .......................... 202110495886.1

(51) Int. Cl.
*G06F 13/16* (2006.01)
(52) U.S. Cl.
CPC ................ *G06F 13/1673* (2013.01)
(58) Field of Classification Search
CPC ............ G06F 13/1673; G06F 13/28
USPC ....................................................... 710/22
See application file for complete search history.

(56) References Cited

U.S. PATENT DOCUMENTS

| | | | | |
|---|---|---|---|---|
| 6,697,885 | B1 * | 2/2004 | Goodfellow | G06F 13/28 710/24 |
| 7,111,092 | B1 * | 9/2006 | Mitten | G06F 13/4221 710/33 |
| 7,877,524 | B1 * | 1/2011 | Annem | G06F 13/28 710/22 |
| 8,271,700 | B1 * | 9/2012 | Annem | G06F 13/28 710/22 |

(Continued)

FOREIGN PATENT DOCUMENTS

| | | |
|---|---|---|
| CN | 1658613 A | 8/2005 |
| CN | 105656805 A | 6/2016 |
| WO | 2013147872 A1 | 10/2013 |

OTHER PUBLICATIONS

Hao Zhou, The implementation and Optimization of Network Driver of FT 1000A Processor, China National Knowledge Infrastructure Database, 2016.

*Primary Examiner* — Titus Wong
(74) *Attorney, Agent, or Firm* — Timothy T. Wang; Ni, Wang & Massand, PLLC

(57) ABSTRACT

An improved data access method for direct memory access (DMA), comprising: allocating m DMA hardware descriptors, and n data buffer units from a data buffer to the controller; constructing software descriptors of the buffer into a two-dimensional array with each row directing to one buffer unit, wherein the value of a first subscript of each array item ranges between 0 and n−1, and the value of a second subscript ranges between 0 and 1; respectively storing a virtual and physical address of the same buffer unit (Continued)

in a column of the two-dimensional array of the corresponding software descriptor; creating an index to establish a directional relationship between the buffer units and the software descriptors, the index comprising an idle index and a scheduling index; and implementing the hardware and software descriptors access by the CPU and DMA to a memory in a data transfer process of the high-speed interface.

10 Claims, 6 Drawing Sheets

(56) References Cited

U.S. PATENT DOCUMENTS

| | | | | |
|---|---|---|---|---|
| 2006/0288129 | A1* | 12/2006 | Pope | G06F 13/385 |
| | | | | 710/22 |
| 2011/0235936 | A1* | 9/2011 | Lin | G06V 10/36 |
| | | | | 382/305 |
| 2012/0250689 | A1* | 10/2012 | Pettey | H04L 67/1001 |
| | | | | 370/392 |
| 2014/0019664 | A1* | 1/2014 | Simon | G06F 13/28 |
| | | | | 710/308 |

* cited by examiner

US 12,487,947 B2

DATA ACCESS METHOD FOR DIRECT MEMORY ACCESS (DMA), AND PROCESSOR WITH CIRCULAR BUFFER REUSE

CROSS REFERENCE TO RELATED APPLICATION

This patent application claims the benefit and priority of Chinese Patent Application No. 202110495886.1 filed on May 7, 2021, the disclosure of which is incorporated by reference herein in its entirety as part of the present application.

TECHNICAL FIELD

The present disclosure relates to direct memory access (DMA) technology, and more particularly, to DMA data access technology.

BACKGROUND

In a communication transceiver process, a high-speed interface such as PCIe, USB, and Ethernet basically uses DMA in combination with an interruption mode when accessing a memory, and traditional streaming DMA mapping is used for data buffering. In this way, each time of receiving and sending involves the request and release of the data buffer memory, which affects the receiving and sending speed, and also increases the power consumption of the hardware. In addition, there is also a problem of cache coherency. An API needs to be invoked to refresh or invalidate a cache, which makes cache maintenance relatively time-consuming, affects the transceiver performance of the high-speed interface, and increases the power consumption of the hardware. There is a need for improvements.

SUMMARY

In view of this, the present disclosure proposes an improved data access method for Direct Memory Access (DMA). According to an example of the present disclosure, the method comprises: when initializing a controller corresponding to a high-speed interface, allocating n data buffer units from a memory, and allocating, to the buffer units, m direct memory access (DMA) hardware descriptors from the memory and software descriptors from the memory, the buffer units forming a buffer; constructing the software descriptors into a two-dimensional array, each row of the two-dimensional array directing to one buffer unit, and one column of the two-dimensional array being used for storing virtual addresses of the buffer units and the other column being used for storing physical addresses of the buffer units; wherein the value of a first subscript of each array item in the two-dimensional array ranges between 0 and n−1, and the value of a second subscript ranges between 0 and 1; creating an index for indicating a directional relationship between the buffer units and the software descriptors, the index comprising an idle index and a scheduling index; and implementing, on the basis of at least the index, the hardware descriptors and the software descriptors, access by the DMA to the memory in a data transfer process of the high-speed interface.

According to the method of the present disclosure, in some examples, the idle index comprises a sending idle index Tx iIDX directing to a first idle buffer unit used for a sending portion, and the scheduling index comprises a sending scheduling index Tx sIDX directing to a first in-use buffer unit used for the sending portion; and the two-dimensional array of the software descriptors Tx SDes used for the sending portion is constructed such that an array item with the first subscript being Tx iIDX or Tx sIDX and the second subscript being 0 is used for storing the virtual address, and an array item with the first subscript being Tx iIDX or Tx sIDX and the second subscript being 1 is used for storing the physical address.

According to the method of the present disclosure, in some examples, implementing, on the basis of at least the index, the hardware descriptors and the software descriptors, access by the CPU and DMA to the memory in a data transfer process of the high-speed interface comprises: finding out an idle buffer unit in the buffer by means of the Tx iIDX, acquiring a pointer of the virtual address of the required idle buffer unit, writing data to be sent into the required idle buffer unit, and adding 1 to the Tx iIDX; filling the pointer of the physical address of the required idle buffer unit into the corresponding hardware descriptor Tx HDes of the sending portion; after the DMA transfers, according to the Tx HDes, data in the idle buffer unit to a bus and sends out same, modifying status information of the Tx HDes to be use for CPU, notifying a driver in an interruption manner, and notifying the driver of status information of successful send out by means of the bus; the driver notified in an interruption manner accessing the Tx HDes to acquire the status information, and releasing the Tx HDes to a DMA pool; adding 1 to the Tx sIDX; and when the value of the Tx iIDX or the Tx sIDX exceeds n−1, setting the Tx iIDX or the Tx sIDX to 0.

According to the method of the present disclosure, in some examples, the idle index further comprises a receiving idle index Rx iIDX directing to a first idle buffer unit used for a receiving portion, and the scheduling index further comprises a receiving scheduling index Rx sIDX directing to a first in-use buffer unit used for the receiving portion; and the two-dimensional array of the software descriptors Rx SDes used for the receiving portion is constructed such that an array item with the first subscript being Rx iIDX or Rx sIDX and the second subscript being 1 is used for storing the physical address, and an array item with the first subscript being Rx iIDX or Rx sIDX and the second subscript being 0 is used for storing the virtual address.

According to the method of the present disclosure, in some examples, implementing, on the basis of at least the index, the hardware descriptors and the software descriptors, access by the CPU and DMA to the memory in a data transfer process of the high-speed interface comprises: finding out an idle buffer unit in the buffer according to the Rx iIDX, acquiring the physical address of the required idle buffer unit, writing same into the hardware descriptor Rx HDes of the receiving portion, and adding 1 to the Rx iIDX; after the DMA transfers, according to the Rx HDes, data of receiving FIFO of the controller to the acquired required idle buffer unit, the controller modifying the status of the Rx HDes to be use for CPU, and notifying the driver in an interruption manner; the driver notified in an interruption manner comparing the physical address of the acquired required idle buffer unit in the Rx HDes with the physical address stored in the item with the first subscript being Rx sIDX and the second subscript being 1 in the two-dimensional array of the Rx SDes, and if the two are the same, the driver transferring data in the acquired required idle buffer unit to a protocol stack by means of the virtual address of the acquired required idle buffer unit; the driver releasing the Rx HDes back to the DMA pool; the protocol stack processing the data, and adding 1 to the Rx sIDX; and when the value of the Rx iIDX or the Rx sIDX exceeds n−1, setting the Rx iIDX or the Rx sIDX to 0.

According to the method of the present disclosure, in some examples, the hardware descriptors use a coherent DMA mapped memory, and the buffer uses a coherent DMA mapped memory.

According to another aspect of the present disclosure, also provided is a data access system for direct memory access (DMA), comprising a controller corresponding to a high-speed interface, a DMA controller, and a bus. The system further comprises a management and control unit, wherein the management and control unit is configured to: when initializing the controller corresponding to the high-speed interface, allocate n data buffer units from a memory to the controller, and allocate, to the buffer units, m direct memory access (DMA) hardware descriptors from the memory and software descriptors from the memory; construct the software descriptors into a two-dimensional array, each row of the two-dimensional array directing to one buffer unit, and one column of the two-dimensional array being used for storing virtual addresses of the buffer units and the other column being used for storing physical addresses of the buffer units; wherein the value of a first subscript of each array item in the two-dimensional array ranges between 0 and n−1, and the value of a second subscript ranges between 0 and 1; create an index for indicating a directional relationship between the buffer units and the software descriptors, the index comprising an idle index and a scheduling index; and implement, on the basis of at least the index, the hardware descriptors and the software descriptors, access by the DMA to the memory in a data transfer process of the high-speed interface.

According to another aspect of the present disclosure, also provided is a processor, comprising a processing portion and a storage portion, wherein the storage portion stores an instruction, and the processing portion is configured to implement any method described above when executing the instruction.

DETAILED DESCRIPTION OF THE EMBODIMENTS

To make the objectives, features, and advantages of the present disclosure clearer and better understandable, the following will describe the embodiments of the present disclosure in detail with reference to the accompanying drawings. Many specific details are described in the following description to facilitate a full understanding of the present disclosure. However, the present disclosure can be carried out in many different ways from those described herein, and those skilled in the art can make similar improvements without departing from the scope of the present disclosure, and thus the present disclosure is not limited to the embodiments disclosed below.

Figure 1:
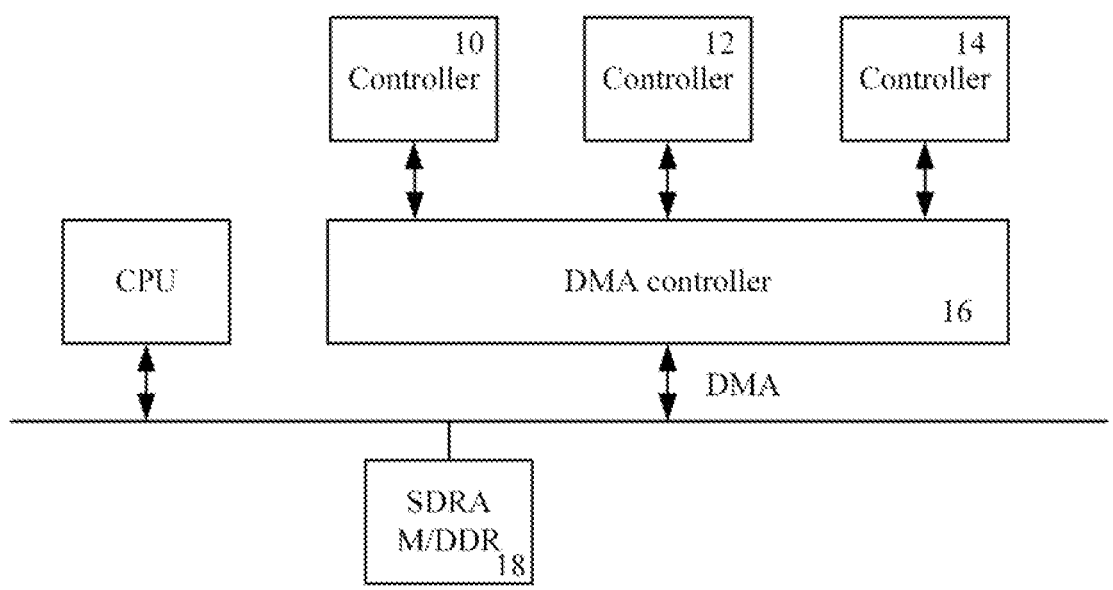
FIG. 1 is a schematic structural diagram of a high-speed interface management system according to an example of the present disclosure.

FIG. 1 is a schematic structural diagram of a management system for DMA memory access in a data transmission process of a high-speed interface according to an example of the present disclosure. A controller 10, a controller 12, and a controller 14 are communicatively connected to a direct memory access (DMA) controller 16, respectively. The DMA controller 16 is connected to a memory 18 and a data buffer (not shown) by means of a bus. The memory 18 is, in this example, Synchronous Dynamic Random-Access Memory (SDRAM), or Double Data Rate (DDR). The data buffer is generally provided inside the memory 18. The DMAC may be provided as an example in various controllers of a high-speed interface data transmission system, such as controller 10, controller 12, and controller 14.

By way of example and not limitation, the controller 10, the controller 12, and the controller 14 illustrated in FIG. 1 are a PCIe controller, a USB controller, and an Ethernet controller, respectively. PCIe is a high-speed universal access front-end IO network, USB is a medium-speed universal non-access back-end IO network, and Ethernet is a high-speed universal non-access back-end external network. Although USB and Ethernet are non-access networks, their controllers typically are connected to the front-end access network by means of QPI, NOC, PCIe, etc., especially USB and Ethernet controllers integrated directly inside the SOC. The access mentioned herein refers to accessing a main memory (memory).

Figure 2:
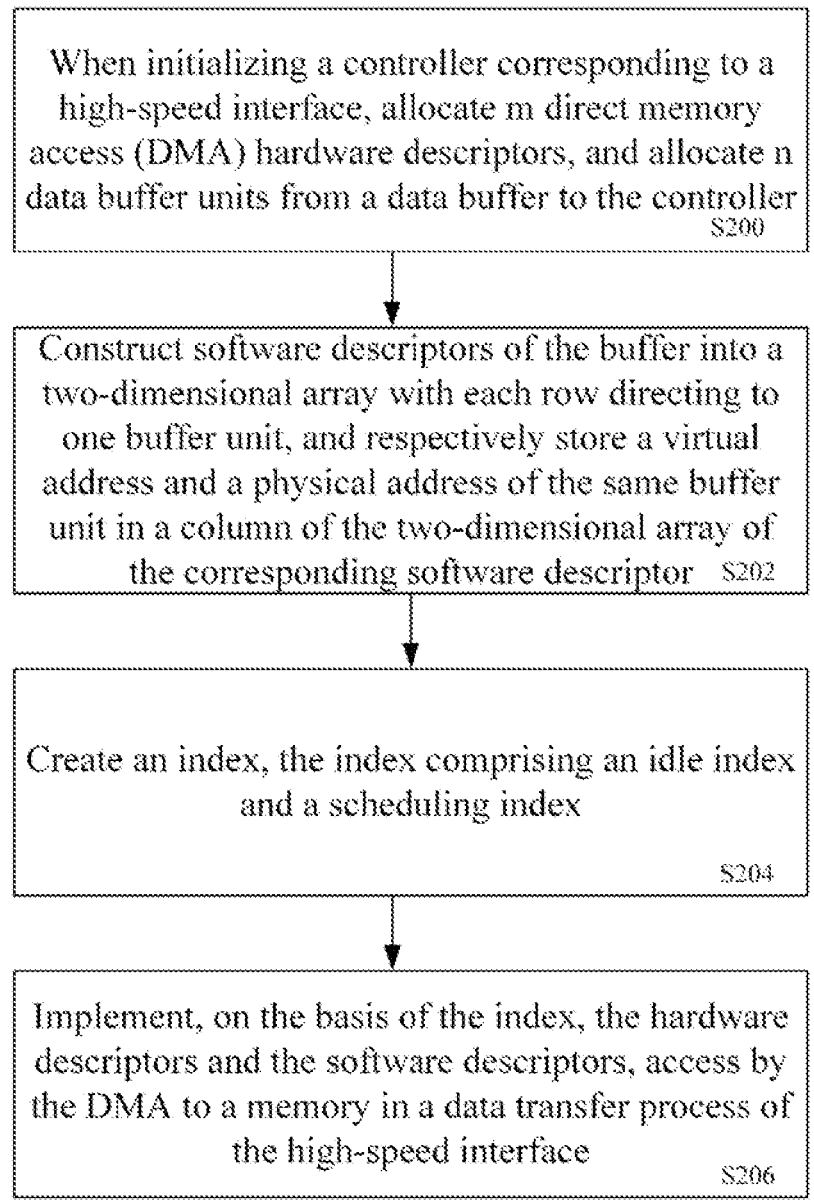
FIG. 2 is a flowchart of a method for a high-speed interface relationship system according to an example of the present disclosure.

FIG. 2 is a flowchart of a data access method for direct memory access (DMA) according to an example of the disclosure. The method shown in FIG. 2 is executed in the environment shown in FIG. 1 herein for explanation. In step S200, when initializing a controller corresponding to a high-speed interface, n data buffer units are allocated from a memory, m DMA hardware descriptors HDes are allocated from the memory and software descriptors are allocated from the memory to the allocated buffer units; the buffer units form a buffer. Wherein m is an integer greater than 0, and n is an integer greater than 0. For example, when loading and initializing the drivers of the controller 10, the controller 12, and the controller 14, data buffer (hereinafter, also referred to as buffer or BF) units are allocated from the memory 18, and DMA hardware descriptors HDes are allocated to these data buffer units. For convenience, in the following description, the number of the allocated DMA hardware descriptors HDes is denoted by m, and the number of the allocated data buffer units is denoted by n. However, it should be understood that m may be different, and n may be different for different controllers. For the same controller, m and n may also be different for the sending portion and the receiving portion. For example, for the controller 10, the number of the DMA hardware descriptors Tx HDes of the sending portion is $m_{Tx}$ and the number of the data buffer units is $n_{Tx}$, while the number of the DMA hardware descriptors Rx HDes of the receiving portion is $m_{Rx}$ and the number of the data buffer units is $n_{Ry}$; wherein $m_{Ry}$ may be the same as or different from $m_{Tx}$, and $n_{Rx}$ may be the same as or different from $n_{Tx}$. It should be understood that the subscripts of $m_{Tx}$ and $n_{Tx}$ indicate that they are used to indicate m and n related to the sending portion, and the subscripts of $m_{Ry}$ and $n_{Ry}$ indicate that they are used to indicate m and n related to the receiving portion. Specifically, m and n may be calculated according to corresponding bus bandwidths and rates, and adjusted to appropriate values according to an actual transmission situation, wherein the actual transmission situation may, for example, take performance of a CPU, occupation rate, running efficiency of a software code, etc. into consideration. The size of the allocated data buffer space may then be determined according to different controller interfaces. For example, if the controller is a PCIe controller or a USB controller, a 4 KB data buffer space is allocated, and if the controller is an Ethernet controller, a 2 KB data buffer space is allocated. In various examples of the present disclosure, m and n are both integers greater than or equal to 1.

It should be noted that, in the example of the present disclosure, the data buffer formed by the buffer units adopts a manner of coherent DMA mapping. Coherent DMA mapping is adopted so that the system can continuously use the DMA buffer, rather than at one time, during working. Coherent DMA always allocates mapping when loading and initializing drivers, and releases mapping when unloading drivers. In addition, by adopting the coherent DMA mapping, when the CPU and the DMA initiate parallel access to the data buffer, they can both see the update to the DMA data buffer by the other party, and thus the influence of the cache does not need to be considered. The hardware descriptors HDes of the DMA also adopt a manner of coherent DMA mapping, and the request and release of the hardware descriptors are managed in a DMA pool manner.

In step S202, software descriptors are constructed into a two-dimensional array, wherein the two-dimensional array has two columns and multiple rows, each row directs to one buffer unit, and two columns of the two-dimensional array respectively store virtual addresses and physical addresses of the buffer units; wherein the value of a first subscript of each array item in the two-dimensional array ranges between 0 and n−1, and the value of a second subscript ranges between 0 and 1.

It should be understood that the value described in the present disclosure ranging between 0 and 1 includes 0 and 1; and the value ranging between 0 and n−1 includes 0 and n−1.

It should be noted that, when the method is applied to the management of the data sending portion, n is the number of the buffer units allocated to the sending portion; and when the method is applied to the management of the data receiving portion, n is the number of the buffer units allocated to the receiving portion. It should be understood that n here refers only to the number of the buffer units allocated to the sending portion or to the number of the buffer units allocated to the receive portion, but as mentioned above the number of the buffer units used for the sending portion and the number of the buffer units used for the receive portion are not necessarily the same, n here only has the denotation function and is not used to define a particular number. The usage of m is similar to that of n in this description, and is not repeated herein.

For example, the allocated software descriptors SDes are constructed into a two-dimensional array, and the array is arranged such that each row thereof sequentially directs to one buffer unit in the data buffer, in other words, the rows in the array and the buffer units are in one-to-one correspondence. The first column and the second column of the two-dimensional array respectively store the virtual addresses and the physical addresses of the data buffer units. As an example, the first column stores the virtual addresses of the buffer units and the second column stores the physical addresses of the buffer units. For example, the first column of the first row stores the virtual address of one buffer unit and the second column of the row stores the physical address of the same buffer unit. In some examples, it is also possible that the first column of the two-dimensional array stores the physical addresses and the second column stores the virtual addresses.

In step S204, an index for indicating a directional relationship between the buffer units and the software descriptors is created, the index comprising an idle index and a scheduling index. As an example, the idle index comprises a sending idle index Tx iIDX directing to a first idle buffer unit used for a sending portion, and the scheduling index comprises a sending scheduling index Tx sIDX directing to a first in-use buffer unit used for the sending portion; In the two-dimensional array of the software descriptors Tx SDes used for the sending portion, an array item with the first subscript being Tx iIDX or Tx sIDX and the second subscript being 0 is used for storing the virtual address, and an array item with the first subscript being Tx iIDX or Tx sIDX and the second subscript being 1 is used for storing the physical address.

In still other examples, the idle index further comprises a receiving idle index Rx iIDX directing to a first idle buffer unit used for a receiving portion, and the scheduling index further comprises a receiving scheduling index Rx sIDX directing to a first in-use buffer unit used for the receiving portion; and in the two-dimensional array of the software descriptors Rx SDes used for the receiving portion, an array item with the first subscript being Rx iIDX or Rx sIDX and the second subscript being 1 is used for storing the physical address, and an array item with the first subscript being Rx iIDX or Rx sIDX and the second subscript being 0 is used for storing the virtual address.

In still other examples, Tx iIDX, Tx sIDX, Rx iIDX, and Rx sIDX are created at the same time. In the examples below, the four indexes included at the same time will be taken as an example for explanation.

In step S206, on the basis of at least the hardware descriptors, the software descriptors and the index established between the software descriptors and the buffer units, access by the DMA to the memory in a data transfer process of the high-speed interface is implemented.

In this way, in the process of receiving and/or sending data, the request and release of the buffer units in the data buffer may be implemented by means of simple indexes of the two-dimensional array as the software descriptors adopt the two-dimensional array. In practical use, a callback function can be used for the upper layer protocol stack and the bottom layer driver to perform function calling in an interruption manner, thus, the whole procedure of the processing is not affected, and the change to the program codes is very small. Therefore, although all the data buffer units always occupy the memory in the whole access process, according to the solution of the present disclosure, it is possible to obtain a higher transceiver processing speed and improve the working performance of the system by exchanging space for time (this is more obvious in the case where the current memory becomes larger and larger). In addition, according to the solution of the present disclosure, as the cache does not need to be frequently maintained, it is possible to reduce software errors while increasing the processing speed.

Figure 3:
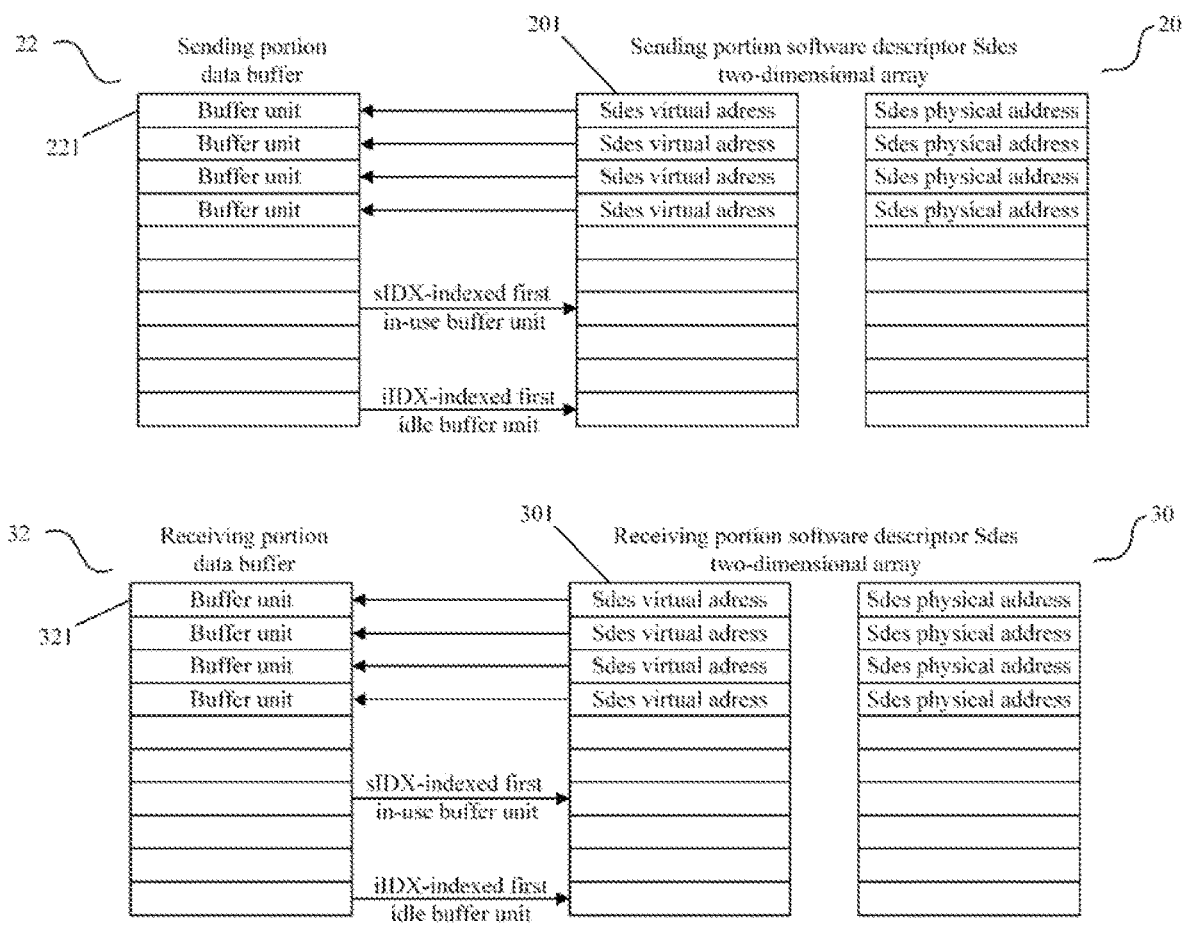
FIG. 3 is an illustrative diagram of a correlation between a data buffer and software descriptors SDes according to an example of the present disclosure.

FIG. 3 is an illustrative diagram of a correlation between a data buffer 22 and software descriptors SDes 20 according to an example of the present disclosure, wherein the data buffer 22 comprises several data buffer units. As shown in the figure, in the two-dimensional array of the software descriptors SDes 20, the first column stores the virtual addresses of the buffer units and the second column stores the physical addresses of the buffer units. The data buffer 22 of the sending portion comprises n data buffer units, and the sending portion software descriptors Tx SDes comprise 2n array items (namely, 2n two-dimensional array members). For example, the first row 201 of the sending portion software descriptors Tx SDes 20 directs to a first buffer unit 221 of the data buffer 22 of the sending portion, wherein the first column of the first row 201 stores the virtual address of the first buffer unit 221, and the second column stores the physical address of the first buffer unit 221. Similarly, a data buffer 32 of the receiving portion comprises n data buffer units, and receiving portion software descriptors Rx SDes 30 comprise a plurality of two-dimensional arrays. For example, the first row 301 of the receiving portion software descriptors 30 directs to a first buffer unit 321 of the data buffer 32 of the receiving portion, wherein the first column of the first row 301 stores the virtual address of the first buffer unit 321, and the second column stores the physical address of the first buffer unit 321. In the example described below in conjunction with FIG. 3, Tx iIDX, Tx sIDX, Rx iIDX and Rx sIDX are initially all set to 0 in order to direct to the first software descriptors SDes of the sending portion and the receiving portion, respectively.

Figure 4:
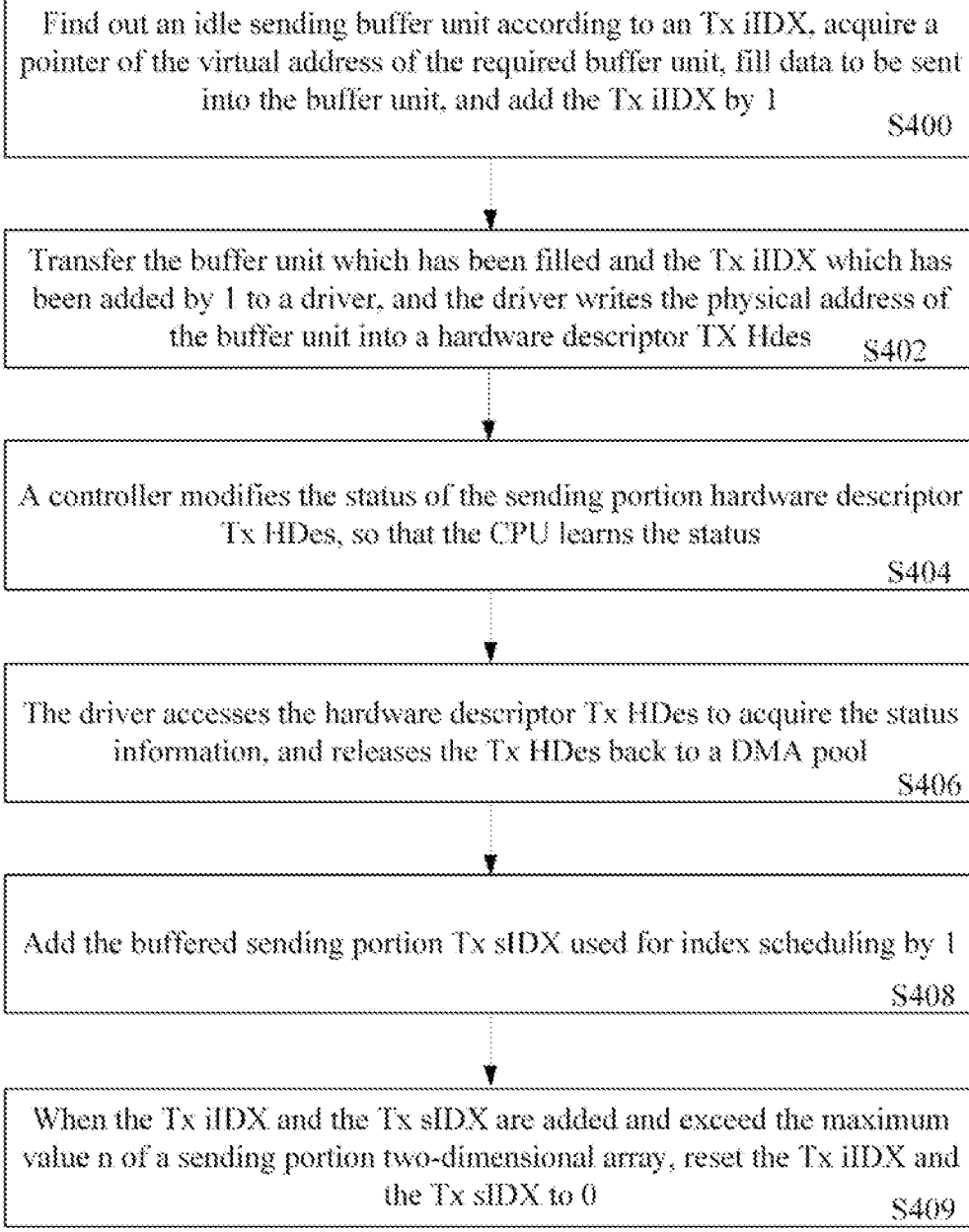
FIG. 4 is a flowchart when performing data sending on the basis of a relationship between data buffers and software descriptors according to an example of the present disclosure.

FIG. 4 is a flowchart of a data sending process according to an example of the present disclosure. Referring to FIGS. 4 and 3 at the same time, in step S400, an idle sending buffer unit is found out according to an Tx iIDX, a pointer of the virtual address of the required idle buffer unit is acquired from the idle sending buffer unit, data to be sent is filled into the acquired required idle buffer unit, and the Tx iIDX is added by 1. Referring to FIG. 2, the first column of the two-dimensional array 20 is the virtual address. The execution of step S400 may be implemented by calling, by the upper layer protocol stack, a callback function provided by the driver.

In step S402, the idle buffer unit which has been filled and the Tx iIDX which has been added by 1 in step S400 are transferred to a driver, and the driver writes the physical address of the idle buffer unit into a hardware descriptor TX Hdes; wherein the second column in the two-dimensional array 20 is the physical address.

In step S404, after the DMA transfers, according to the Tx HDes, data in the idle buffer unit to sending FIFO of a controller and then sends same out by means of a bus, the controller modifies the status of the sending portion hardware descriptor Tx HDes, so that the CPU learns the status. In this case, the driver is notified in an interruption manner, and status information about whether the sending is successful is attached.

In step S406, the driver accesses the hardware descriptor Tx HDes to acquire the status information, and releases the Tx HDes back to a DMA pool.

In step S408, the buffered sending portion Tx sIDX used for index scheduling is added by 1, without releasing the memory used by the buffer unit directed to by the software descriptor Tx SDes. Wherein adding the Tx sIDX by 1 indicates that the content in the current buffer unit has been sent out, and the current buffer unit can be filled with new content.

In step S409, when it is determined that the Tx iIDX in step S400 exceeds the maximum value n−1 of a first subscript of a sending portion two-dimensional array, the Tx iIDX is reset to 0; likewise, when the value of the Tx sIDX in step S408 exceeds the maximum value n−1 of the first subscript of the sending portion two-dimensional army, the Tx sIDX is reset to 0.

Figure 5:
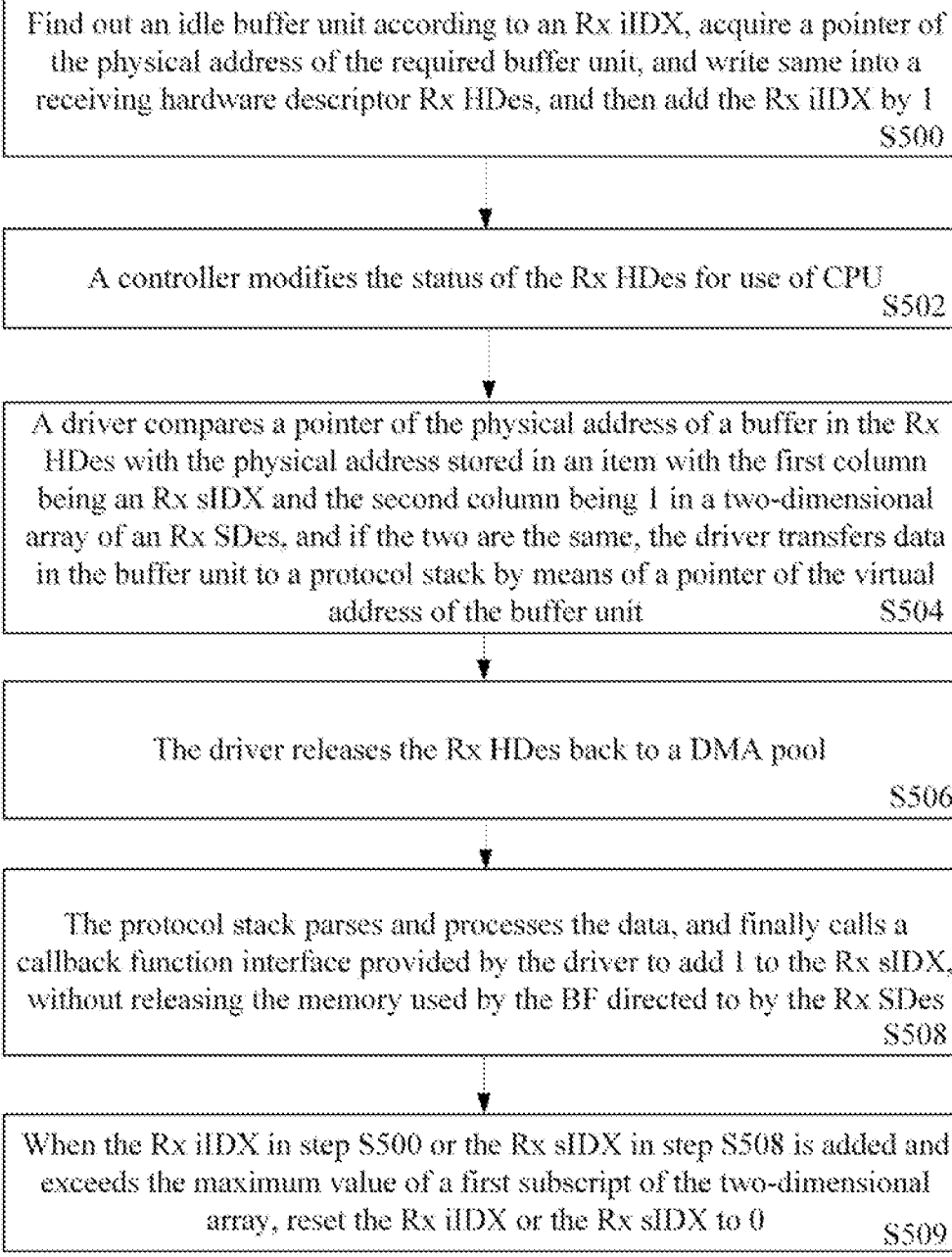
FIG. 5 is a flowchart when performing data receiving on the basis of a relationship between data buffers and software descriptors according to an example of the present disclosure.

FIG. 5 is a flowchart when performing data receiving on the basis of a relationship between a data buffer and software descriptors according to an example of the present disclosure. Referring to FIGS. 5 and 3 at the same time, in step S500, an idle buffer unit is found out according to an Rx iIDX, a pointer of the physical address of the required idle buffer unit is acquired, and is written into a receiving hardware descriptor Rx HDes, and then the Rx iIDX is added by 1. Referring to FIG. 2, the first column of the two-dimensional array 30 is the virtual address, and the second column is the physical address of the corresponding buffer unit.

In step S502, after the DMA transfers, according to the Rx HDes, data of receiving FIFO of a controller to the buffer unit, the controller modifies the status of the Rx HDes for use of CPU, triggers an interrupt, and notifies a driver.

In step S504, the driver compares the physical address of the acquired required idle buffer unit in the Rx HDes with the physical address stored in an item with a first subscript being an Rx sIDX and a second subscript being 1 in a two-dimensional array of an Rx SDes, and if the two are the same, the driver transfers data in the buffer unit to a protocol stack by means of the virtual address of the idle buffer unit. Wherein the virtual address of the buffer unit is the virtual address stored in an item with the first column being the Rx sIDX and the second subscript being 0 in the two-dimensional array of the Rx SDes.

In step S506, the driver releases the Rx HDes back to a DMA pool.

In step S508, the protocol stack parses and processes the data, and finally calls a callback function interface provided by the driver to add 1 to the Rx sIDX, without releasing the memory used by the BF directed to by the Rx SDes.

In step S509, when the value of the Rx iIDX in step S500 exceeds the maximum value n−1 of the first subscript of the two-dimensional array due to the addition by 1, the Rx iIDX is reset to 0; and similarly, when the Rx sIDX in step S508 exceeds the maximum value n−1 of the first subscript of the two-dimensional array due to the addition by 1, the Rx sIDX is reset to 0.

In the processes described in FIGS. 4 and 5, when sIDX≤iIDX: (1) if sIDX≤x<iIDX, the x-indexed buffer unit is in use; and (2) if iIDX≤y≤(n−1), and 0≤y≤sIDX, the y-indexed buffer unit is idle. When iIDX<sIDX: (1) if iIDX≤x<siDX, the x-indexed buffer unit is idle; and (2) if sIDX≤y≤(n−1), and 0≤y<iIDX, the y-indexed buffer unit is in use. Here, siDX refers to Tx sIDX or Rx sIDX, and iLDX refers to Tx iIDX or Rx iIDX. However, it should be noted that the two ends of the comparison expressions given herein both are either used for the sending portion Tx or used for the receiving portion Rx, rather than comparing the sending portion with the receiving portion. Here, x and y are numerical values used to represent indexes, and have no special meaning.

In an example of the present disclosure, a data buffer is managed by using a two-dimensional array of software descriptors, wherein the two-dimensional array is composed of a pair of virtual address and physical address of the data buffer. As an example, a manner of registering a callback function may be used to provide a data buffer to an upper layer protocol stack or a bottom layer for function processing in an interruption manner so as to perform indexing and maintenance, so that the data buffer may be driven (in a Tx sending direction) or DMA (in a Rx receiving direction) refills for data transceiver, thereby avoiding operations of requesting or releasing a memory as far as possible. After the data of the data buffer unit Tx buffer used for the sending portion is sent out, only the index of the two-dimensional array of the buffer software descriptors is modified, so that the Tx buffer can be used for next sending; after the Rx buffer receives the data, only the index of the two-dimensional array of the buffer software descriptors is modified, so that the Rx buffer can be used for next receiving.

In addition, the present disclosure illustratively adopts coherent DMA mapping, which can avoid a maintenance operation on a cache, this is different from that streaming DMA mapping needs to refresh or invalidate caching according to the direction. This is because the memory used for DMA essentially does not need a cache. More specifically, in the Rx receiving direction, the driver itself requests the buffer, and can directly requests a coherent DMA mapped memory. However, during Rx releasing, the release interface needs to be replaced, that is, the maintenance operation of the two-dimensional array index is performed for the driver callback function interface described in this description. In the Tx direction, the interface for requesting the buffer in the protocol stack also needs to be modified to perform the maintenance operation of the two-dimensional array index for the driver callback function interface described in this description. As the two-dimensional array of the buffer software descriptors of the Tx buffer directs to a fixed and preallocated coherent DMA mapped memory, the cache maintenance operation can also be avoided.

Figure 6:
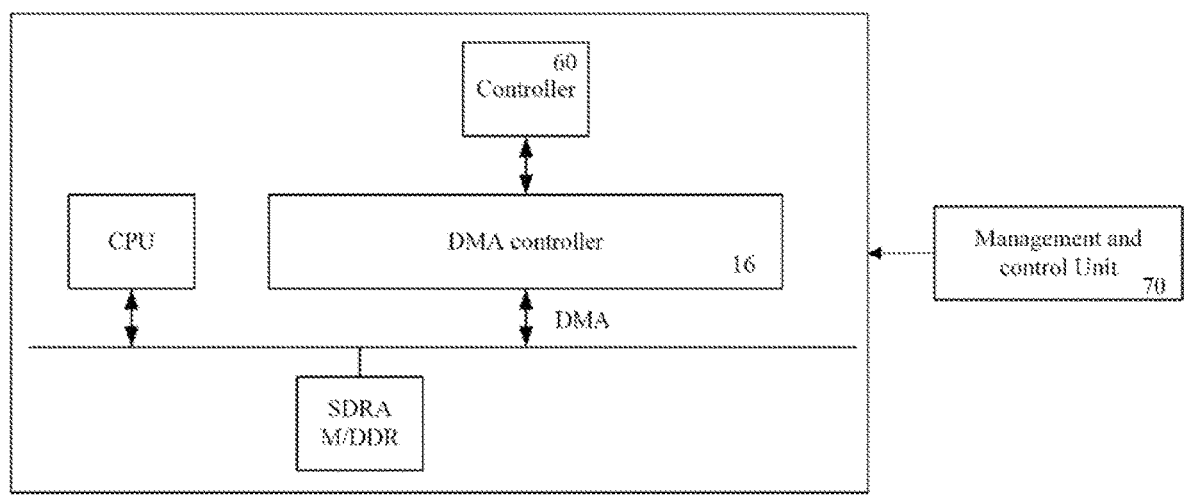
FIG. 6 is a structural diagram of a data access system for direct memory access (DMA) according to an example of the disclosure.

According to an example of the present disclosure, also provided is a data access system for direct memory access (DMA). FIG. 6 is a schematic diagram of the system. As shown, the system comprises a controller 60 corresponding to a high-speed interface, a DMA controller 66, and a bus. Only one controller 60 is illustrated here, and more controllers may be included. The system further comprises a management and control unit 70. The controller 60, the DMA controller 66, the bus, etc. are similar to those described above with reference to FIG. 1, and are not further described.

According to the example of FIG. 6, the management and control unit 70 is configured to, when initializing the controller 60, allocate n data buffer units from a memory to the controller, and allocate, to the buffer units, m direct memory access (DMA) hardware descriptors from the memory and software descriptors from the memory; construct the software descriptors into a two-dimensional array, each row of the two-dimensional array directing to one buffer unit, and the two-dimensional array having two columns, one column being used for storing virtual addresses of the buffer units and the other column being used for storing physical addresses of the buffer units; wherein the value of a first subscript of each array item in the array ranges between 0 and n−1, and the value of a second subscript ranges between 0 and 1; create an index to establish a directional relationship between the buffer units and the software descriptors, the index comprising an idle index and a scheduling index; and implement, on the basis of at least the index, the hardware descriptors and the software descriptors, access by the DMA to the memory in a data transfer process of the high-speed interface.

The management and control unit 70 is configured to implement the data access method for direct memory access (DMA) as described above with reference to the accompanying drawings, and for brevity, the implementation process is not described herein again. The management and control unit 70 may be implemented in a software manner, and alternatively, the management and control unit 70 may also be implemented in a hardware manner or in a manner of combination of hardware and software. Further, the management and control unit 70 may be implemented, for example, in a DMA controller or in other components or units already existing in the system. The management and control unit 70 may also be implemented as a standalone component.

According to an example of the present disclosure, also provided is a processor. The processor comprises a processing portion and a storage portion. The storage portion stores an instruction, the processing portion is configured to execute the instruction, and when the instruction is executed, the data access method for direct memory access (DMA) as described above with reference to the accompanying drawings may be implemented.

In all examples of the present disclosure, the sending portion refers to a module or a device capable of sending a signal, which may also be referred to as a transmitter, a sender, a transmitting device, a sending unit, a transmitting unit, etc. Accordingly, the receiving portion refers to a module or a device that receives a signal, which may also be referred to as a receiver, a receiving device, a receiving unit, etc.

The foregoing examples merely represent several implementations of the present disclosure, and are described in detail, but are not intended to limit the scope of the present disclosure. It should be noted that, for those skilled in the art, various modifications and improvements can be made without departing from the concept of the present disclosure, and all these modifications and improvements belong to the scope of protection of the present disclosure. Therefore, the scope of protection of the present disclosure should be defined according to the appended claims.

What is claimed is:

1. A data access method for direct memory access (DMA), comprising:
when initializing a controller corresponding to a high-speed interface, allocating n number of data buffer units from a memory, and allocating, to the buffer units, m number of DMA hardware descriptors from the memory and software descriptors from the memory, the buffer units forming a first buffer portion and a second buffer portion, wherein n and m are integers greater than 0;
constructing the software descriptors into a two-dimensional array, each row of the two-dimensional array directing to one buffer unit, and one column of the two-dimensional array for storing virtual addresses of the buffer units and the other column for storing physical addresses of the buffer units; wherein each array item of the two-dimensional array is defined by two subscripts the value of a first subscript of each array item ranges between 0 and n−1, and the value of a second subscript ranges between 0 and 1;
using an index for indicating a directional relationship of data between the buffer units and the software descriptors, the index comprising an idle index and a scheduling index, wherein the directional relationship is either sending or receiving;
implementing, on the basis of at least the index, the hardware descriptors and the software descriptors, access by the DMA to the memory in a data transfer process of the high-speed interface; and wherein the first buffer portion and the second buffer portion are a sending portion and a receiving portion, respectively, the idle index is a pointer for the first idle buffer, and a scheduling index is a pointer for the first buffer in use.

2. The method according to claim 1, wherein an idle index comprises a sending idle index Tx iIDX directing to a first idle buffer unit for a sending portion, and a scheduling index comprises a sending scheduling index Tx sIDX directing to a first in-use buffer unit for the sending portion; and the two-dimensional array of the software descriptors Tx SDes for the sending portion is constructed such that an array item with the first subscript being Tx iIDX or Tx sIDX and the second subscript being 0 is for storing the virtual address, and an array item with the first subscript being Tx iIDX or Tx sIDX and the second subscript being 1 is for storing the physical address.

3. The method according to claim 2, wherein implementing, on the basis of at least the index, the hardware descriptors and the software descriptors, access by the DMA to the memory in a data transfer process of the high-speed interface comprises:

finding out an idle buffer unit in the buffer by means of the Tx iIDX, acquiring a pointer of the virtual address of the required idle buffer unit, writing data to be sent into the acquired required idle buffer unit, and adding 1 to the Tx iIDX;

filling the pointer of the physical address of the acquired required idle buffer unit into the corresponding hardware descriptor Tx HDes of the sending portion;

after a DMA transfers, according to the Tx HDes, data in the acquired required idle buffer unit to a bus and sends out the same data as the DMA transfers, modifying a status information of the Tx HDes to be used for a CPU, notifying a driver in an interruption manner, and notifying the driver of status information of successful send out by means of the bus;

the driver notified in an interruption manner accessing the Tx HDes to acquire the status information, and releasing the Tx HDes to a DMA pool;

adding 1 to the Tx sIDX; and when the value of the Tx iIDX or the Tx sIDX exceeds n−1, setting the Tx iIDX or the Tx SIDX to 0.

4. The method according to claim 1, wherein the idle index further comprises a receiving idle index Rx iIDX directing to a first idle buffer unit for a receiving portion, and the scheduling index further comprises a receiving scheduling index Rx sIDX directing to a first in-use buffer unit for the receiving portion, and the two-dimensional array of the software descriptors Rx SDes for the receiving portion is constructed such that an array item with the first subscript being Rx iIDX or Rx sIDX and the second subscript being 1 is for storing the physical address, and an array item with the first subscript being Rx iIDX or Rx sIDX and the second subscript being 0 is for storing the virtual address.

5. The method according to claim 4, wherein implementing, on the basis of at least the index, the hardware descriptors and the software descriptors, access by the DMA to the memory in a data transfer process of the high-speed interface comprises:

finding out an idle buffer unit in the buffer according to the Rx iIDX, acquiring the physical address of a required idle buffer unit, writing the physical address of the required idle buffer unit into the hardware descriptor Rx HDes of the receiving portion, and adding 1 to the Rx iIDX;

after the DMA transfers, according to the Rx HDes, data of receiving first-in-first-out (FIFO) of the controller to the acquired required idle buffer unit, the controller modifying the status of the Rx HDes to be use for CPU, and notifying the driver in an interruption manner;

the driver notified in an interruption manner comparing the physical address of the acquired required idle buffer unit in the Rx HDes with the physical address stored in the item with the first subscript being Rx sIDX and the second subscript being 1 in the two-dimensional array of the Rx SDes, and if a comparison of the two physical addresses are the same, the driver transferring data in the acquired required idle buffer unit to a protocol stack by means of the virtual address of the acquired required idle buffer unit;

the driver releasing the Rx HDes back to the DMA pool;

the protocol stack processing the data, and adding 1 to the Rx sIDX; and when the value of the Rx iIDX or the Rx sIDX exceeds n−1, setting the Rx IIDX or the Rx sIDX to 0.

6. The method according to claim 1, wherein the buffer uses a coherent DMA mapped memory, and the hardware descriptors use a coherent DMA mapped memory.

7. A data access system for direct memory access (DMA), comprising a controller corresponding to a high-speed interface, a DMA controller, and a bus, wherein the system further comprises a management and control unit, the management and control unit being configured to:

when initializing the controller corresponding to the high-speed interface, allocate n number of data buffer units from a memory to the controller, and allocate, to the buffer units, m number of DMA hardware descriptors from the memory and software descriptors from the memory, wherein n and m are integers greater than 0;

construct the software descriptors into a two-dimensional array, each row of the two-dimensional array directing to one butter unit, and one column of the two-dimensional array for storing virtual addresses of the buffer units and the other column for storing physical addresses of the buffer units; wherein each array item in the two-dimensional array is defined by two subscripts the value of a first subscript of each array item ranges between 0 and n−1, and the value of a second subscript ranges between 0 and 1:

using an index for indicating a directional relationship of data between the buffer units and the software descriptors, the index row comprising an idle index and a scheduling index, wherein the directional relationship is either sending or receiving;

implement, on the basis of at least the index, the hardware descriptors and the software descriptors, access by the DMA to the memory in a data transfer process of the high-speed interface, and wherein the first buffer portion and the second buffer portion are a sending portion and a receiving portion, respectively, the idle index is a pointer for the first idle buffer, and a scheduling index is a pointer for the first buffer in use.

8. The system according to claim 7, wherein the idle index comprises a sending idle index Tx iIDX directing to a first idle buffer unit for a sending portion, and a scheduling index comprises a sending scheduling index Tx sIDX directing to a first in-use buffer unit for the sending portion; and the two-dimensional array of the software descriptors Tx SDes for the sending portion is constructed such that an array item with the first subscript being Tx iIDX or Tx sIDX and the second subscript being 0 is for storing the virtual address, and an array item with the first subscript being Tx iIDX or Tx sIDX and the second subscript being 1 is for storing the physical address.

9. The system according to claim 8, wherein the idle index further comprises a receiving idle index Rx iIDX directing to a first idle buffer unit for a receiving portion, and the scheduling index further comprises a receiving scheduling index Rx sIDX directing to a first in-use buffer unit for the receiving portion; and the two-dimensional array of the software descriptors Rx SDes for the receiving portion is constructed such that an array location with the first subscript being Rx iIDX or Rx sIDX and the second subscript being 1 is for storing the physical address, and an array location with the first subscript being Rx iIDX or Rx sIDX and the second subscript being 0 is for storing the virtual address.

10. A processor, comprising a processing portion and a storage portion, wherein the storage portion stores an instruction, and the processing portion is configured to implement the method as described in claim 1 when executing the instruction.

\* \* \* \* \*